United States Patent
Chen

(10) Patent No.: US 10,672,314 B2
(45) Date of Patent: *Jun. 2, 2020

(54) DISPLAY PANEL DETECTION METHOD AND DISPLAY PANEL DETECTION DEVICE

(71) Applicants: HKC CORPORATION LIMITED, Shenzhen (CN); CHONGQING HKC OPTOELECTRONICS TECHNOLOGY CO., LTD., Chongqing (CN)

(72) Inventor: Wei Chen, Chongqing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/313,464

(22) PCT Filed: Dec. 14, 2017

(86) PCT No.: PCT/CN2017/116291
§ 371 (c)(1),
(2) Date: Dec. 27, 2018

(87) PCT Pub. No.: WO2018/108135
PCT Pub. Date: Jun. 21, 2018

(65) Prior Publication Data
US 2019/0318675 A1    Oct. 17, 2019

(30) Foreign Application Priority Data
Dec. 16, 2016    (CN) .......................... 2016 1 1182537

(51) Int. Cl.
*G09G 3/00*    (2006.01)
*G06T 7/00*    (2017.01)
(Continued)

(52) U.S. Cl.
CPC ............. *G09G 3/006* (2013.01); *G06T 7/001* (2013.01); *G09G 3/20* (2013.01); *H04N 17/004* (2013.01);
(Continued)

(58) Field of Classification Search
CPC ........ G09G 3/006; G09G 3/20; G09G 3/3688; G09G 2300/0439; G09G 2330/04;
(Continued)

(56) References Cited

U.S. PATENT DOCUMENTS 8,963,937 B2 * 2/2015 Yang ..................... G06F 13/372
345/204
2002/0039089 A1 * 4/2002 Lim ....................... G09G 3/006
345/87
(Continued)

FOREIGN PATENT DOCUMENTS

| CN | 101685040 A | 3/2010 |
| CN | 103105684 A | 5/2013 |

(Continued)

OTHER PUBLICATIONS

International Search Report dated Feb. 24, 2018 in the corresponding PCT application (application No. PCT/CN2017/116291).

*Primary Examiner* — Darlene M Ritchie
(74) *Attorney, Agent, or Firm* — Kilpatrick Townsend & Stockton, LLP

(57) ABSTRACT

A display panel detection method and a display panel detection device, the detection method comprising the following steps: storing an image used for detection in a source driver circuit board of a display panel; electrically connecting a power board generating a power signal directly to the source driver circuit board; transmitting the power signal and a clock signal to the source driver circuit board, the clock signal being directly generated by the power board; connecting a data transmission port of the display panel to a serial interface of a computer system, a detection program for comparing a sample image and an image being configured in the computer system; and comparing the pixel consistency of the image and the sample image so as to produce a comparison result.

17 Claims, 8 Drawing Sheets

(51) Int. Cl.
*H04N 17/00* (2006.01)
*G09G 3/20* (2006.01)
*G02F 1/1362* (2006.01)

(52) U.S. Cl.
CPC .................. *G02F 1/136204* (2013.01); *G06T 2207/30121* (2013.01); *G09G 2300/0439* (2013.01); *G09G 2310/08* (2013.01); *G09G 2330/04* (2013.01); *G09G 2330/12* (2013.01)

(58) Field of Classification Search
CPC ........... G09G 2330/12; G09G 2310/08; H04N 17/02; H04N 17/004; G02F 1/136204; G06T 2207/30121; G06T 2207/30168; G06T 7/001; G06T 7/0004; G06T 7/0002; G06T 7/0014
See application file for complete search history.

(56) References Cited

U.S. PATENT DOCUMENTS

| | | | |
|---|---|---|---|
| 2009/0207106 A1* | 8/2009 | Mizukoshi | G09G 3/3233 345/76 |
| 2010/0011249 A1* | 1/2010 | Kim | G06F 11/2221 714/30 |
| 2011/0063455 A1* | 3/2011 | Krancher | H04N 17/02 348/180 |
| 2011/0169792 A1* | 7/2011 | Shimizu | G02F 1/1309 345/204 |
| 2014/0125645 A1* | 5/2014 | Ghaderi | G09G 3/006 345/211 |
| 2014/0146231 A1* | 5/2014 | Lin | G06F 3/1454 348/554 |
| 2014/0347404 A1 | 11/2014 | Lee et al. | |
| 2015/0035817 A1* | 2/2015 | Hwang | G09G 3/20 345/212 |
| 2016/0104456 A1* | 4/2016 | Tsai | G09G 3/3648 345/213 |
| 2016/0247436 A1* | 8/2016 | Lee | G09G 3/2003 |
| 2018/0018910 A1* | 1/2018 | Jang | G09G 3/006 |

FOREIGN PATENT DOCUMENTS

| | | |
|---|---|---|
| CN | 105609024 A | 5/2016 |
| CN | 106504687 A | 3/2017 |

* cited by examiner

DISPLAY PANEL DETECTION METHOD AND DISPLAY PANEL DETECTION DEVICE

FIELD

The present application relates to the field of display technologies, and in particular, to a display panel detection method and a display panel detection device.

BACKGROUND

The liquid crystal display has many advantages such as thin body, power saving, no radiation and so on, and has been widely used. Most of the liquid crystal displays on the market are liquid crystal displays of backlight type, which include a liquid crystal panel and a backlight module. The working principle of the liquid crystal panel is to place liquid crystal molecules in two parallel glass substrates, and apply a driving voltage on the two glass substrates to control the rotation direction of the liquid crystal molecules, so as to refract the light of the backlight module to produce a picture.

Among them, thin film transistor liquid crystal display (Thin Film Transistor-Liquid Crystal Display, TFT-LCD) has gradually occupied a dominant position in the display field due to its low power consumption, excellent picture quality and high production yield. Likewise, the thin film transistor liquid crystal display includes a liquid crystal panel and a backlight module. The liquid crystal panel includes a color filter substrate (also referred to as a CF Substrate) and a thin film transistor array substrate (Thin Film Transistor Substrate, TFT Substrate). A transparent electrode is present on the opposite inner side of the substrate. A layer of liquid crystal molecules (Liquid Crystal, LC) is sandwiched between the two substrates. The liquid crystal panel realizes the display purpose by controlling the orientation of the liquid crystal molecules through an electric field, changing the polarization state of the light, realizing the penetration and blocking of the optical path though the polarizing plate.

At present, the manufacturing procedure of LCD open cell (Liquid Crystal Display open cell) is generally divided into pre-procedure, mid-procedure and post-procedure. The pre-procedure is mainly to manufacture a TFT (Thin Film Transistor) glass. The mid-procedure mainly refers to attaching the TFT glass and the color filter, and adding the upper and lower polarizing plates; and the post-procedure refers to pressing a driver IC (integrated circuit) and a printed circuit board to the TFT glass, and an open cell (liquid crystal panel) is completed. In the post-procedure, a high temperature and high humidity test is required to ensure the resistance of the open cell after bonding is complete in the production line.

For example, when the liquid crystal panel is subjected to high temperature and high humidity test, a plurality of external test circuit boards are required to provide a picture and a clock signal. The external test circuit board has a poor resistance to high temperature and high humidity, and the external test circuit board is easily damaged in the repeated high temperature and high humidity tests.

In addition, the conventional picture display function test is to judge the picture displayed on the display panel by a human eye. This detection method is simple, but the biggest problem is that manual detection is required, and manual comparisons of the test results are required, which is inefficient and easy to make mistakes.

SUMMARY

Embodiments of the present disclosure provide a display panel detection method and a detection device of a display panel detection device capable of preventing damage of a plurality of external test circuit boards.

The objective of the present application is achieved by the following technical solutions.

According to one aspect of the present application, the present application discloses a display panel detection method. The detection method includes the following steps:

storing a picture for detection into a source driver circuit board of the display panel;

electrically connecting a power board generating a power signal directly with the source driver circuit board;

transmitting the power signal and a clock signal to the source driver circuit board;

connecting the display panel to a computer system that is provided with a sample picture and a picture comparison detection program;

comparing pixel consistency of the picture and the sample picture so as to produce a comparison result.

The clock signal is generated directly by the power board. This is a specific way to transmit the clock signal in the present application. The portion that generates the clock signal is integrated on the power board so that the power board can generate the clock signal directly. In this way, the power board can not only transmit the power signal to the source driver circuit board, but also transmit the clock signal to the source driver circuit board. Thus, during the detection process, only the power board and the source driver circuit board need to be electrically connected, without additional connection to the logic board or other circuit portions. In this way, the assembly process is further saved, and the detection efficiency is further improved. Moreover, the power board itself has a good resistance to high temperature and high humidity, and may not be easily damaged during the high temperature and high humidity resistance test.

The power board is connected with the first connector of the source driver circuit board through a first connection line, and the power board is connected with the second connector of the source driver circuit board through a second connection line; the power signal is transmitted to the first connector through the first connection line, and the clock signal is transmitted to the second connector through the second connection line; a source driver chip of the source driver circuit board is connected with the first connector and the second connector respectively through a connection bar. This is a specific way for electrical connection and signal transmission between the power board and the source driver circuit board. The power board is electrically connected with the two connectors through two connection lines respectively, and the power signal and the clock signal are transmitted respectively, thereby ensuring normal transmission of various signals.

The clock signal is generated directly by the source driver circuit board. The source driver circuit board generally includes a source driver chip, a connection bar and a connector, and the clock signal may be generated by the source driver chip or the connection bar or the connector. There is no need to connect the logic board or other detection circuit portions additionally, which further saves the assembly process and further improves the detection efficiency.

The clock signal is generated directly by the source driver chip of the source driver circuit board. This is another specific way to transmit the clock signal in the present application. The portion that generates the clock signal is integrated on source driver chip of the source driver circuit board, so that the source drive chip can generate the clock signal directly and complete the transmission. Thus, during the detection process, only the power signal of the power board needs to be transmitted to the source driver circuit board, without additional connection to the logic board or other circuit portions. In this way, the assembly process is further saved and the detection efficiency is further improved.

The power board is connected with a third connector of the source driver circuit board through a third connection line, and the power signal is transmitted to the third connector through the third connection line; the source driver chip is connected with the third connector through a connection bar. In addition, the power board transmits the power signal by being connected with the third connected directly through the third connection line, and the connection way is simple and convenient, without additional connection to other circuit portions, facilitating the operation of the operator.

The clock signal is generated directly by a clock signal board, and the clock signal board and the source driver circuit board are electrically connected. This is a further specific way to transmit the clock signal in the present application. The clock signal board that generates the clock signal is electrically connected with the source driver circuit board, so that the clock signal board can transmit the clock signal to the source driver circuit board. Since cost of the logic board is high, the present application saves cost by replacing the logic board with the clock signal board.

The picture is stored in the source driver chip of the source driver circuit board. Storing the picture directly in the source driver chip of the source driver circuit board is more convenient for detection.

According to another aspect of the present application, the present application further discloses a display panel detection system. The detection system includes:

a picture storage device configured to store a picture for detection, and the picture storage device is stored in a source driver circuit board of the display panel;

a power board configured to generate a power signal, and the power board is electrically connected with the source driver circuit board directly;

a clock signal device disposed on the power board, configured to generate a clock signal, and the clock signal device and the source driver circuit board are electrically connected; and a computer system connecting with the display panel, and the computer system is provided with a sample picture and a picture comparison detection program for comparing pixel consistency of the picture and the sample picture so as to produce a comparison result.

The clock signal device is disposed on the power board. The power board is connected with the first connector of the source driver circuit board through a first connection line, and the power board is connected with the second connector of the source driver circuit board through a second connection line; the power signal is transmitted to the first connector through the first connection line, and the clock signal is transmitted to the second connector through the second connection line; a source driver chip of the source driver circuit board is connected with the first connector and the second connector respectively through a connection bar. This is a specific way to provide the clock signal device. The device that generates the clock signal is integrated on the power board, so that the power board can generate the clock signal directly. In this way, the power board can not only transmit the power signal to the source driver circuit board, but also the clock signal to the source drive circuit board. Thus, during the detection process, only the power board and the source driver circuit board need to be electrically connected, without additional connection to the logic board or other circuit portions. In this way, the assembly process is further saved, and the detection efficiency is further improved. Moreover, the power board itself has a good resistance to high temperature and high humidity, and may not be easily damaged during the high temperature and high humidity resistance test. The power board is electrically connected with the two connectors through two connection lines respectively, and the power signal and the clock signal are transmitted respectively, so that the normal transmission of various signals can be ensured.

The clock signal device is disposed on the source driver circuit board. The source driver circuit board generally includes a source driver chip, a connection bar and a connector, and the clock signal device can be disposed on the source driver chip or the connection bar or the connector to generate the clock signal. There is no need to connect the logic board or other detection circuit portions additionally, which further saves the assembly process and further improves the detection efficiency.

The clock signal device is disposed on the source driver chip of the source driver circuit board. The power board is connected with a third connector of the source driver circuit board through the third connection line. The power signal is transmitted to the third connector through the third connection line, and the source driver chip is connected with the third connector through a connection bar. This is another specific way to provide the clock signal device. The device that generates the clock signal is integrated on the source driver circuit board of the source driver chip, so that the source driver chip can generate clock signal directly and complete the transmission. Thus, during the detection process, only the power signal of the power board needs to be transmitted to the source driver circuit board without additional connection to the logic board or other circuit portions. In this way, the assembly process is further saved and the detection efficiency is further improved. In addition, the power board transmits the power signal by being connected with the third connector directly through the third connection line, and the connection way is simple and convenient, without additional connection to other circuit portions, facilitating the operation of the operator.

When the existing liquid crystal panel is subjected to the high temperature and high humidity test, different external test boards are required to provide the picture and the clock signal. However, the plurality of external test boards have a poor resistance to high temperature and high humidity, and the external test circuit boards are easily damaged in the repeated high temperature and high humidity tests. In an actual test process, the applicant uses TCON (Logical Board) to provide the picture and the clock signal, and uses the power board to provide the power signal, thereby reducing procedure and cost comparing with using a plurality of external test circuit boards to provide the picture and the clock signal respectively. However, the cost of TCON is high, its high temperature and high temperature resistance are also insufficient, and it will be damaged in repeated high temperature and high humidity tests. Therefore, the applicant adopts the technical solution of the present application. In the present application, the picture for detection is directly stored in the source driver circuit board of the display panel, and the power board is electrically connected with the source driver circuit board directly. The detection can be performed to the display panel by transmitting the power signal and the clock signal to the source driver circuit board, eliminating the need to use the plurality of external test circuit boards or TCON to provide the picture, and the high temperature and high humidity test is achieved. Therefore, the application can achieve the high temperature and high humidity detection without using the plurality of external test circuit boards or TCON, thereby eliminating the plurality of external test circuit boards, and preventing damage of multiple external test circuit boards. In this way, not only the equipment input cost and the maintenance cost during the detection process are saved, but also the procedure during the detection process is saved, and the production efficiency is improved.

In addition, the detection process of the detection method is completely controlled by the detection process, without manual intervention. There will be no misdetection due to the fatigue of the inspector. The detection accuracy is improved, and the detection time and cost are saved.

BRIEF DESCRIPTION OF THE DRAWINGS

The accompanying drawings are included to provide a further understanding of embodiments of the present application and form a part of the specification for illustrating embodiments of the present application and for explaining the principles of the present application in conjunction with a text description. Apparently, the accompanying drawings in the following description are only some embodiments of the present invention, and persons of ordinary skill in the art can derive other drawings from the accompanying drawings without creative efforts. In the drawings.

DETAILED DESCRIPTION OF THE INVENTION

Specific structural and functional details disclosed herein are merely representative for purposes of describing example embodiments. The present invention, however, may be embodied in many alternate forms and should not be construed as limited to only the example embodiments set forth herein.

As used herein, spatial or directional terms, such as "left", "right", "inner", "outer", "above", "below", "top", "bottom", and the like, are understood to encompass various alternative orientations and, accordingly, such terms are not to be considered as limiting. In addition, the terms "first," "second," "third," "fourth," and the like in the description and the claims, if any, may be used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements, but may include other elements not expressly listed or inherent to such process, method, article, or apparatus.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A display panel detection method and a display panel detection device according to the embodiments of the present application are described below with reference to FIGS. 1 to 8.

The present application will be described below with reference to FIGS. 1 to 8 and specific embodiments in further details.

Figure 1:
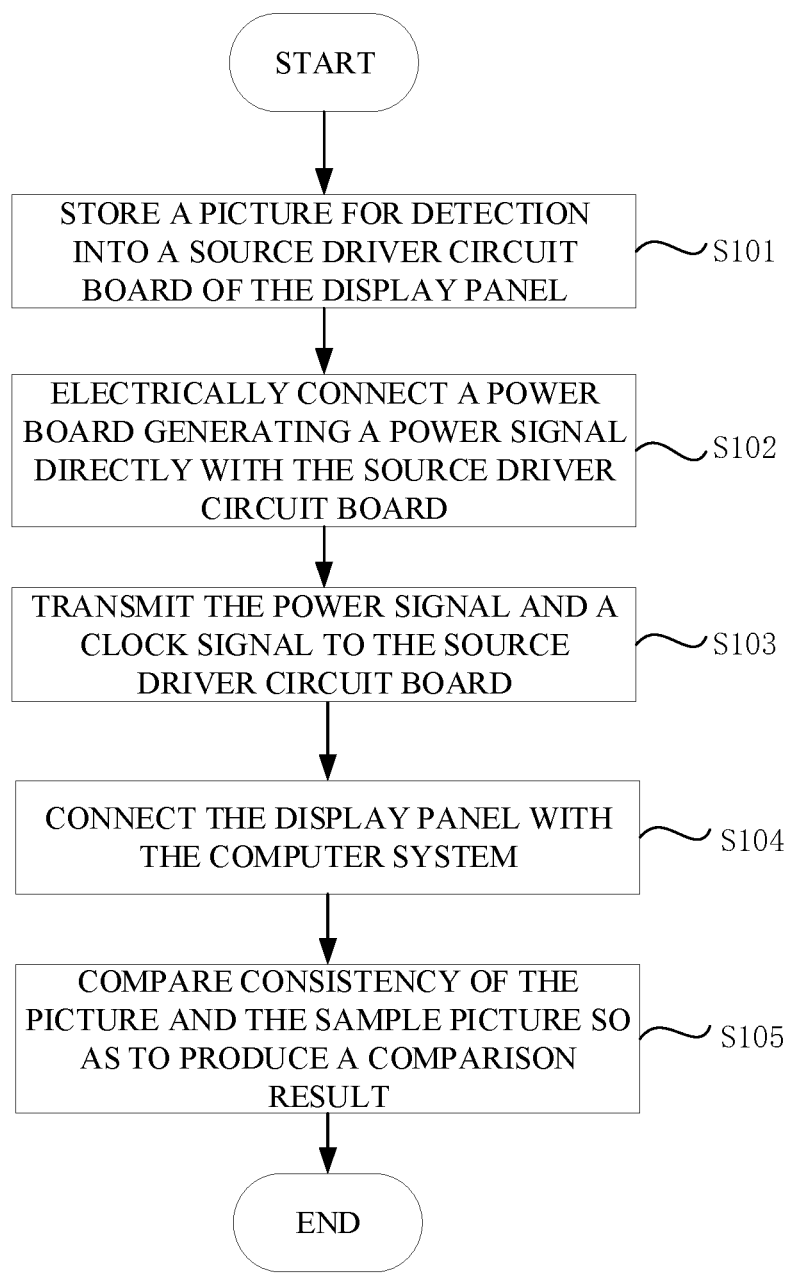
FIG. 1 is a flow diagram illustrating a display panel detection method according to an embodiment of the present application.

In an embodiment of the present application, as shown in FIG. 1, which is a flow diagram illustrating a display panel detection method according to an embodiment of the present application, the detection method includes the following steps: step S101, step S102, step S103, step S104, and step S105. Specifically, step S101: store a picture for detection into a source driver circuit board of the display panel;

step S102: electrically connect a power board generating a power signal directly with the source driver circuit board;

step S103: transmit the power signal and a clock signal to the source driver circuit board;

step S104: connect the display panel with the computer system; and step S105: compare consistency of the picture and the sample picture so as to produce a comparison result.

In this embodiment, the picture for detection is stored directly in the source driver circuit board of the display panel, and the power board is electrically connected with the source driver circuit board directly. The detection can be performed to the display panel by transmitting the power signal and the clock signal to the source driver circuit board, eliminating the need to use the plurality of external test circuit boards or TCON to provide the picture, and the high temperature and high humidity test is achieved. Therefore, the application can achieve the high temperature and high humidity detection without using the plurality of external test circuit boards or TCON, thereby eliminating the plurality of external test circuit boards, and preventing damage of multiple external test circuit boards. In this way, not only the equipment input cost and the maintenance cost during the detection process are saved, but also the procedure during the detection process is saved, and the production efficiency is improved.

The source driver circuit board includes a source driver chip, and in step S101, the picture is specifically stored in the source driver chip for the high temperature and high humidity detection.

The picture includes but is not limited to red picture, green picture, blue picture, black picture and gray picture.

The power signal is a DC voltage signal or an AC voltage signal. The power signal includes but is not limited to a ground signal, a relatively high voltage signal and a relatively low voltage signal.

In step S102, the power board is electrically connected with the source driver circuit board directly. Specifically, the power board is connected with the connector of the source driver circuit board through a connection line (e.g., a wire), and then the connector is connected with the connection bar, and then the connection bar is connected with the source driver chip. As a result, the power signal of the power board is transmitted to the connector through the connection line, and then the connector transmits the signal to the connection bar, and then the signal is transmitted to source driver chip through the connection bar for the high temperature and high humidity detection.

In step S103, the power signal and the clock signal are transmitted to the source driver circuit board. Specifically, the power signal and the clock signal are transmitted to the source driver chip of the source driver circuit board, so that the high temperature and high humidity detection can be completed.

In step S104, the display panel is connected with the computer system. For example, the display panel has a data transmission port. The computer system has a serial interface (USB interface). The serial interface of the computer system is connected with the data transmission port respectively through a data line. The computer system is provided with a sample picture and a picture comparison detection program.

In step S105, the consistency of the picture and the sample picture is compared to produce a comparison result. For example, the data transmission port of the display panel transmits the digital picture signal of the picture to the serial interface of the computer system, and the computer system obtains the digital picture signal through the serial interface, restores the digital picture signal to the picture, and performs pixel comparison analysis with the sample picture. If the comparison result is within an error range set by the computer system, then the picture test passes and the test result is displayed on the display of the computer system, and the test ends.

Figure 2:
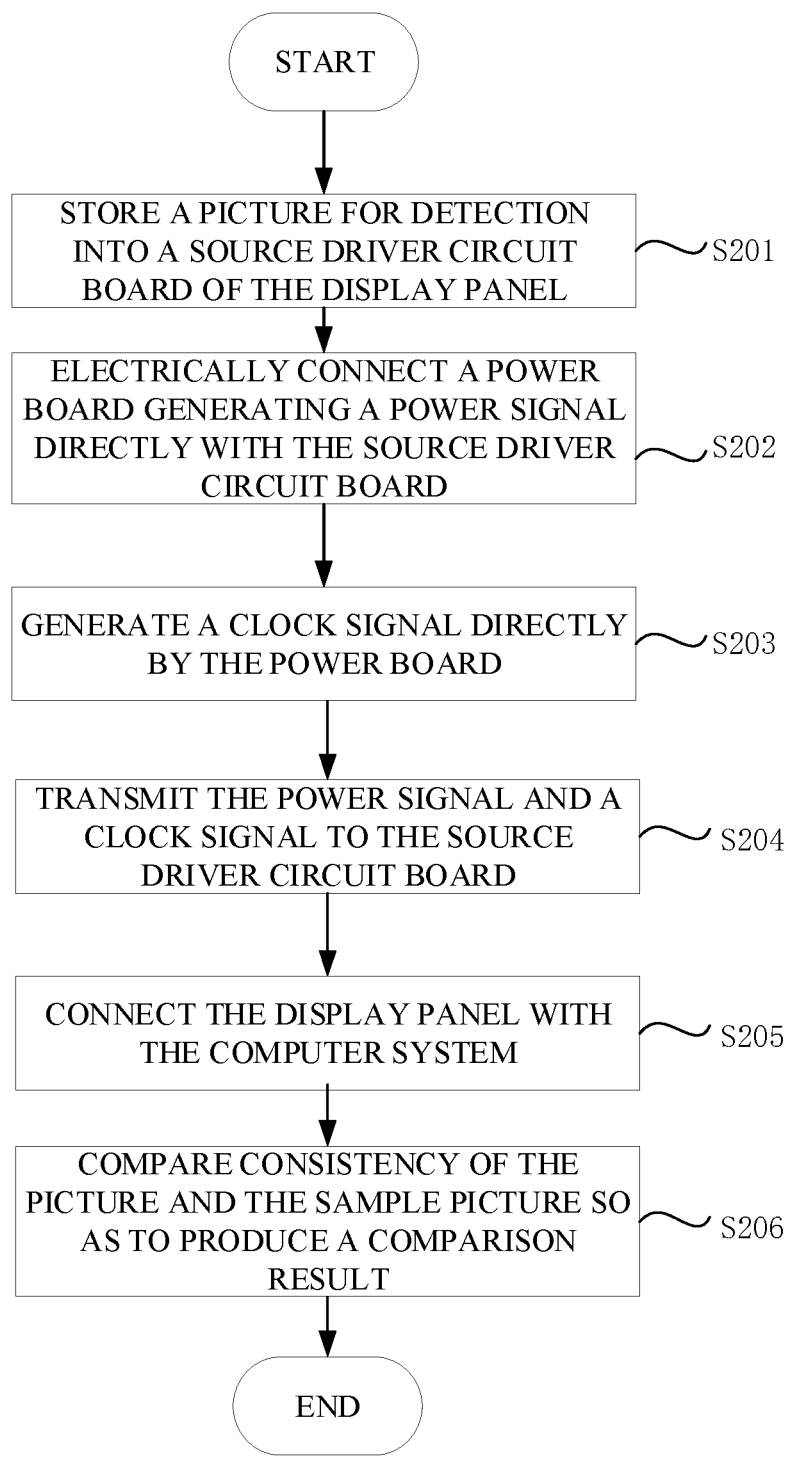
FIG. 2 is a flow diagram illustrating a display panel detection method according to an embodiment of the present application.

In an embodiment of the present application, as shown in FIG. 2, which is a specific flow diagram illustrating a display panel detection method according to an embodiment of the present application, the detection method in FIG. 2 includes step S201, step S202, step S203. step S204, step S205, and step S206. Specifically, step S201: store a picture for detection into a source driver circuit board of the display panel;

step S202: electrically connect a power board generating a power signal directly with the source driver circuit board;

step S203: generate a clock signal directly by the power board;

step S204: transmit the power signal and a clock signal to the source driver circuit board;

step S205: connect the display panel with the computer system; and step S206: compare consistency of the picture and the sample picture so as to produce a comparison result.

Step S201 is the same as step S101 in FIG. 1, and reference may be made to step S101 in FIG. 1; step S202 is the same as step S102 in FIG. 1, and reference may be made to step S102 in FIG. 1; step S205 is the same as step S104 in FIG. 1, and reference may be made to step S104 in FIG. 1; step S206 is the same as step S105 in FIG. 1, and reference may be made to step S105 in FIG. 1; step S201, step S202, step S205, and step S206 are not described in detail herein.

In step S203, the clock signal is generated directly by the power board. This is a specific way to transmit the clock signal in the present application. The portion that generates the clock signal is integrated on the power board. In this embodiment, an oscillator can be integrated on the power board to generate a clock signal through the oscillator. Of course, it should be noted that other structures can also be integrated on the power board to generate a clock signal in this embodiment. In this way, the power board can generate the clock signal directly, so that the power board can not only transmit the power signal to the source driver circuit board, but also transmit the clock signal to the source driver circuit board. Thus, during the detection process, only the power board and the source driver circuit board need to be electrically connected, without additional connection to the logic board or other circuit portions. In this way, the assembly process is further saved, and the detection efficiency is further improved. Moreover, the power board itself has a good resistance to high temperature and high humidity, and may not be easily damaged during the high temperature and high humidity resistance test.

Specifically, the power board is connected with the first connector of the source driver circuit board through a first connection line, and the power board is connected with the second connector of the source driver circuit board through a second connection line; the power signal is transmitted to the first connector through the first connection line, and the clock signal is transmitted to the second connector through the second connection line; a source driver chip of the source driver circuit board is connected with the first connector and the second connector respectively through a connection bar. The power board is electrically connected with the two connectors (the first connector and the second connector) through the connection lines (the first connection line and the second connection line) respectively, and the power signal and the clock signal are transmitted respectively, thereby ensuring normal transmission of various signals.

In step S204, the first connection line is connected with the first connector, and the first connector is connected with the connection bar, and then the connection bar is connected with the source driver chip, so that the power signal of the power board is transmitted to source driver chip through the first connection line, the first connector and the connection bar successively, so as to perform the high temperature and high humidity detection. The second connection line is connected with the second connector, and the second connector is connected with the connection bar, and then the connection bar is connected with the source driver chip, so that the power signal of the power board is transmitted to source driver chip through the second connection line, the second connector and the connection bar successively, so as to perform the high temperature and high humidity detection.

The present embodiment not only saves the logic board or a plurality of other detection circuit boards, and avoids the logic board and other detection boards being damaged and saves the cost, but also saves the procedure and improves the detection efficiency.

In an embodiment of the present application, the clock signal is generated directly by the source driver circuit board. The source driver circuit board includes a source driver chip, a connection bar and a connector, and the clock signal may be generated by the source driver chip or the connection bar or the connector. There is no need to connect the logic board or other detection circuit portions additionally, which further saves the assembly process and further improves the detection efficiency.

Figure 3:
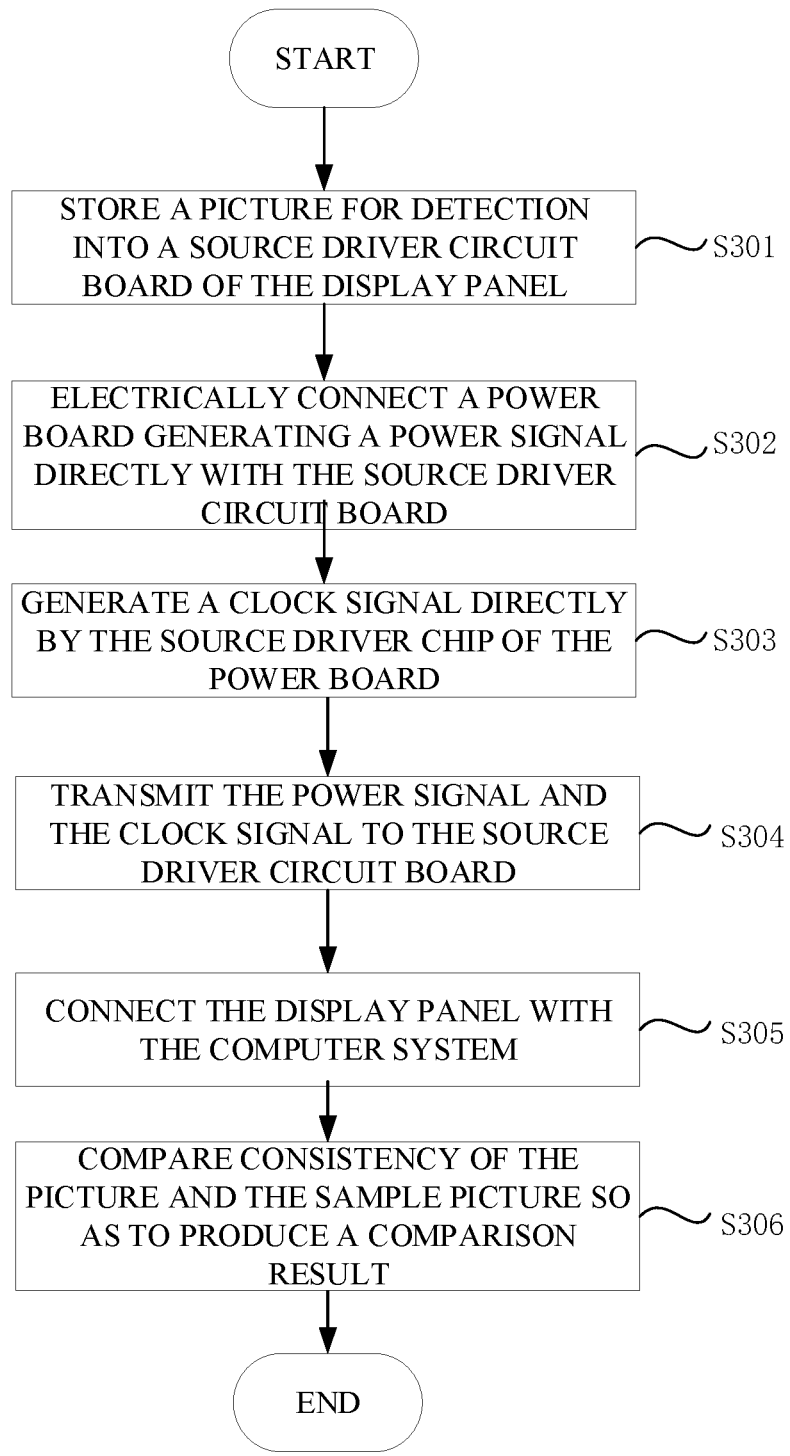
FIG. 3 is a flow diagram illustrating a display panel detection method according to an embodiment of the present application.

Further, FIG. 3 shows another specific flow diagram illustrating a display panel detection method according to an embodiment of the present application. The detection method in FIG. 3 includes step S301, step S302, step S303, step S304, step S305 and step S306. Specifically, step S301: store a picture for detection into a source driver circuit board of the display panel;

step S302: electrically connect a power board generating a power signal directly with the source driver circuit board;

step S303: generate a clock signal directly by the source driver chip of the source driver circuit board;

step S304: transmit the power signal and the clock signal to the source driver circuit board;

step S305: connect the display panel with the computer system; and step S306: compare consistency of the picture and the sample picture so as to produce a comparison result.

Step S301 is the same as step S101 in FIG. 1, and reference may be made to step S101 in FIG. 1; step S302 is the same as step S102 in FIG. 1, and reference may be made to step S102 in FIG. 1; step S305 is the same as step S104 in FIG. 1, and reference may be made to step S104 in FIG. 1; step S306 is the same as step S105 in FIG. 1, and reference may be made to step S105 in FIG. 1; step S301, step S302, step S305, and step S306 are not described in detail herein.

In step S303, the clock signal is generated directly by the source driver chip of the power board. This is another specific way to transmit the clock signal in the present application. The portion that generates the clock signal is integrated on the power board. In this embodiment, an oscillator can be integrated on the power board to generate a clock signal through the oscillator. Of course, it should be noted that other structures can also be integrated on the power board to generate a clock signal in this embodiment. In this way, the source driver chip can generate the clock signal directly and complete the transmission, so that only the power signal of the power board needs to be transmitted to the source driver chip during the detection process, without additional connection to the logic board or other circuit portions. In this way, the assembly process is further saved, and the detection efficiency is further improved.

Specifically, The power board is connected with a third connector of the source driver circuit board through a third connection line, and the power signal is transmitted to the third connector through the third connection line; the source driver chip is connected with the third connector through a connection bar. In addition, the power board directly transmits the power signal by being connected with the third connector through the third connection line, and the connection way is simple and convenient, without additional connection to other circuit portions, facilitating the operation of the operator.

In step S304, the third connection line is connected with the third connector, and the third connector is connected with the connection bar, and then the connection bar is connected with the source driver chip, so that the power signal of the power board is transmitted to the source driver chip through the third connection line, the third connector and the connection bar successively. The source driver chip can generate a clock chip directly so as to perform the high temperature and high humidity detection.

The present embodiment not only saves the logic board or a plurality of other detection circuit boards, and avoids the logic board and other detection boards being damaged and saves the cost, but also saves the procedure and improves the detection efficiency.

Figure 4:
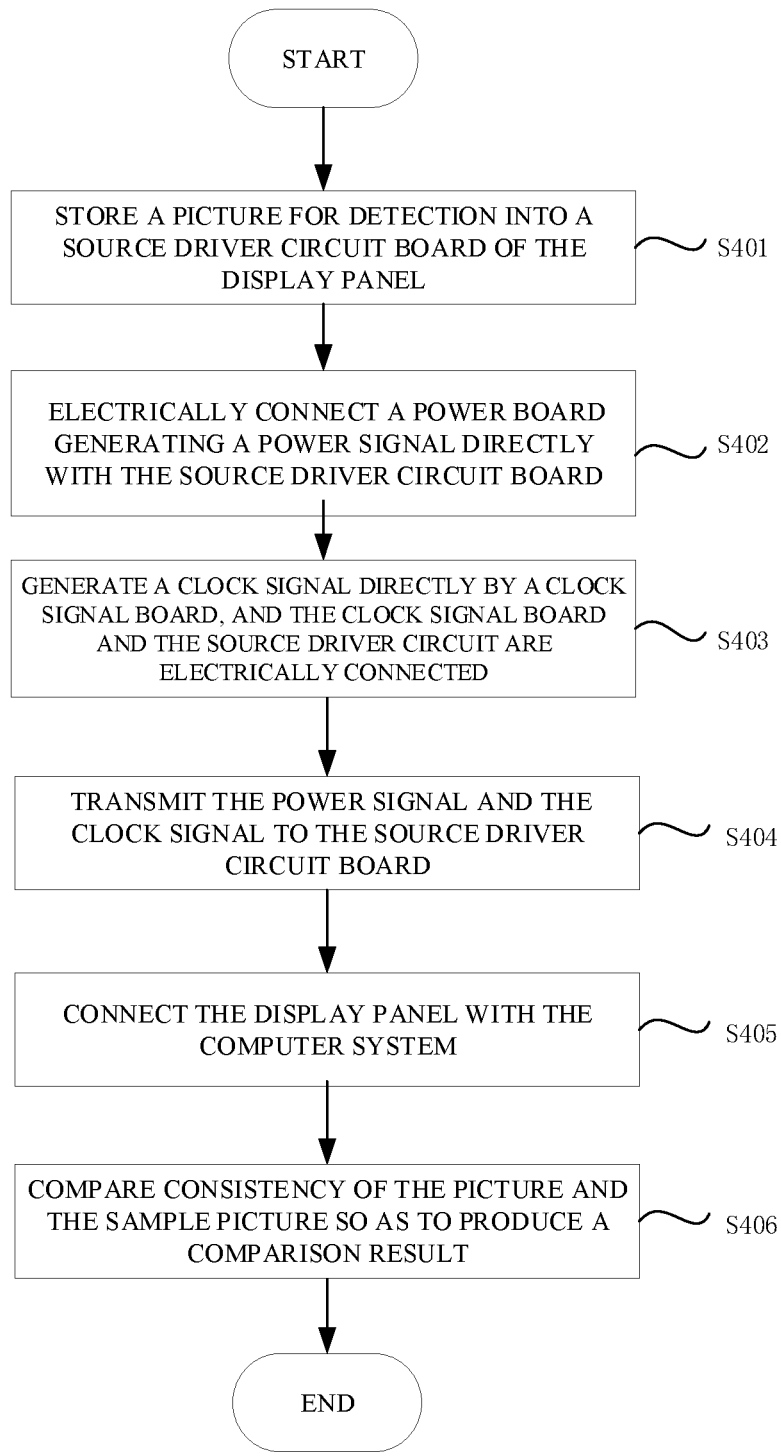
FIG. 4 is a flow diagram illustrating a display panel detection method according to an embodiment of the present application.

In an embodiment of the present application, as shown in FIG. 4, which is still another specific flow diagram illustrating a display panel detection method according to an embodiment of the present application, the detection method in FIG. 4 includes step S401, step S402, step S403, step S404, step S405, and step S406. Specifically, step S401: store a picture for detection into a source driver circuit board of the display panel;

step S402: electrically connect a power board generating a power signal directly with the source driver circuit board;

step S403: generate a clock signal directly by a clock signal board, and the clock signal board and the source driver circuit are electrically connected;

step S404: transmit the power signal and the clock signal to the source driver circuit board;

step S405: connect the display panel with the computer system; and step S406: compare consistency of the picture and the sample picture so as to produce a comparison result. Step S401 is the same as step S101 in FIG. 1, and reference may be made to step S101 in FIG. 1; step S402 is the same as step S102 in FIG. 1, and reference may be made to step S102 in FIG. 1; step S405 is the same as step S104 in FIG. 1, and reference may be made to step S104 in FIG. 1; step S406 is the same as step S105 in FIG. 1, and reference may be made to step S105 in FIG. 1; step S401, step S402, step S405, and step S406 are not described in detail herein.

In the step S403, the clock signal is generated directly by the clock signal board, and the clock signal board and the source driver circuit board are electrically connected. This is still another specific way to transmit the clock signal in the present application. The clock signal board generating the clock signal and the source driver circuit board are electrically connected, so that the clock signal board can transmit the clock signal to the source driver circuit board. Due to the high cost of the logic board or a plurality of other detection boards, this embodiment of the present application saves the cost by replacing a logic board or the plurality of other detection boards with the clock signal board.

In this embodiment, the clock signal board may be integrated with only an oscillator, and the clock signal is generated by the oscillator. Of course, it should be noted that in this embodiment, other structures may also be integrated on the circuit board to generate a clock signal.

In this embodiment, the clock signal board is connected with the connector of the source driver circuit board directly, and the connector is connected with the connection bar of the source driver circuit board, and then the connection bar is further connected with the source driver chip of the source driver circuit board. However, it should be noted that, in this embodiment, the clock signal board can be electrically connected with the power board firstly, and the power board is then connected with the two connectors through two connection lines respectively, and then the two connectors are connected with the connection bar, and the connection bar is then connected with the source driver chip.

In step S404, when the clock signal board is connected with the connector directly, the clock signal is transmitted to the source driver chip through the connector and the connection bar successively; and the power signal is transmitted to the source driver chip through the connection line, the other connector and the connection bar, so as to perform the high temperature and high humidity detection.

When the clock signal board and the power board are connected, the power board is connected with the two connectors through the two connection lines respectively, and the two connectors are connected with the connection bar, and then the connection bar is connected with the source driver chip. The clock signal is transmitted to the source driver chip through one of the connection lines, one of the connectors and the connection bar; and the power signal is transmitted to the source driver chip through the other connection line, the other connector and the connection bar, so as to perform the high temperature and high humidity detection.

Figure 5:
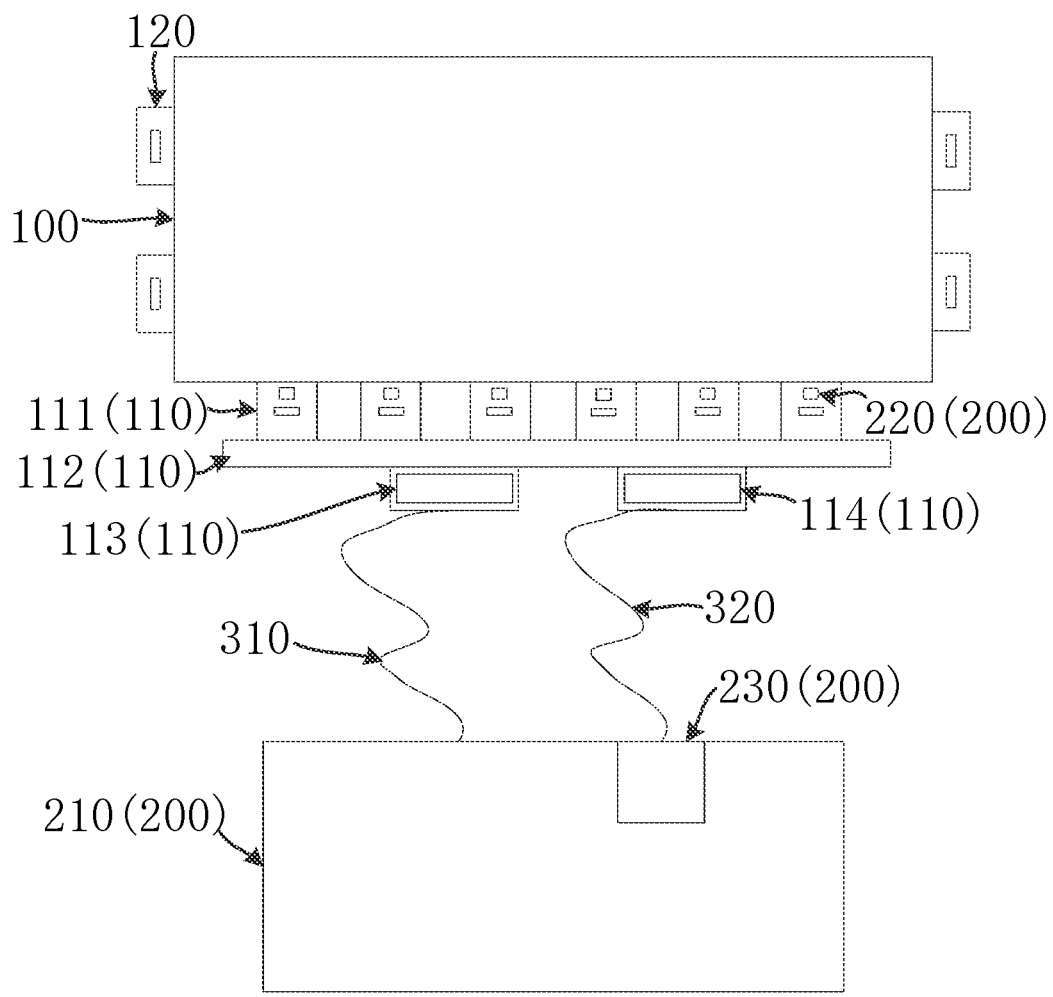
FIG. 5 is a schematic structural diagram illustrating a display panel detection device and a display panel that are cooperated according to an embodiment of the present application.

In an embodiment of the present application, as shown in FIG. 5, which is a schematic structural diagram illustrating a display panel detection device and a display panel that are cooperated according to an embodiment of the present application, the detection system 200 includes a picture storage device 220, a power board 210 and clock signal device 230. The picture storage device is configured to store a picture for detection, and the picture storage device 220 is stored in a source driver circuit board 110 of the display panel 100; the power board 210 is configured to generate a power signal, and the power board 210 is electrically connected with the source driver circuit board 110 directly; the clock signal device 230 is configured to generate a clock signal, and the clock signal device 230 and the source driver circuit board 110 are electrically connected.

The source driver circuit board 110 includes a source driver chip 111, a connection bar 112, a first connector 113 and a second connector 114.

Specifically, the picture storage device 220 is stored in the source driver chip 111, and a logic board is not required for providing a picture, so as to be used for the high temperature and high humidity detection.

The picture includes but is not limited to red picture, green picture, blue picture, black picture and gray picture.

The power signal is a DC voltage signal or an AC voltage signal. The power signal includes but is not limited to a ground signal, a relatively high voltage signal and a relatively low voltage signal.

The clock signal device 230 is disposed on the power board 210. The power board 210 is connected with the first connector 113 of the source driver circuit board through a first connection line 310, and the power board 210 is connected with the second connector 114 of the source driver circuit board through a second connection line 320; the power signal is transmitted to the first connector through the first connection line, and the clock signal is transmitted to the second connector through the second connection line; a source driver chip 111 of the source driver circuit board 210 is connected with the first connector 113 and the second connector 114 respectively through a connection bar 112. This is a specific way to provide the clock signal device. The device that generates the clock signal is integrated on the power board, so that the power board can generate the clock signal directly. In this way, the power board can not only transmit the power signal to the source driver circuit board, but also the clock signal to the source drive circuit board. Thus, during the detection process, only the power board and the source driver circuit board need to be electrically connected, without additional connection to the logic board or other circuit portions. In this way, the assembly process is further saved, and the detection efficiency is further improved. Moreover, the power board itself has a good resistance to high temperature and high humidity, and may not be easily damaged during the high temperature and high humidity resistance test. The power board is electrically connected with the two connectors through two connection lines respectively, and the power signal and the clock signal are transmitted respectively, so that the normal transmission of various signals can be ensured.

In this embodiment, an oscillator can be integrated on the power board, and the clock signal is generated by the oscillator. Of course, it should be noted that in this embodiment, other structures may also be integrated on the power board to generate a clock signal.

The present embodiment not only saves the logic board or a plurality of other detection circuit boards, and avoids the logic board and other detection boards being damaged and saves the cost, but also saves the procedure and improves the detection efficiency.

Figure 6:
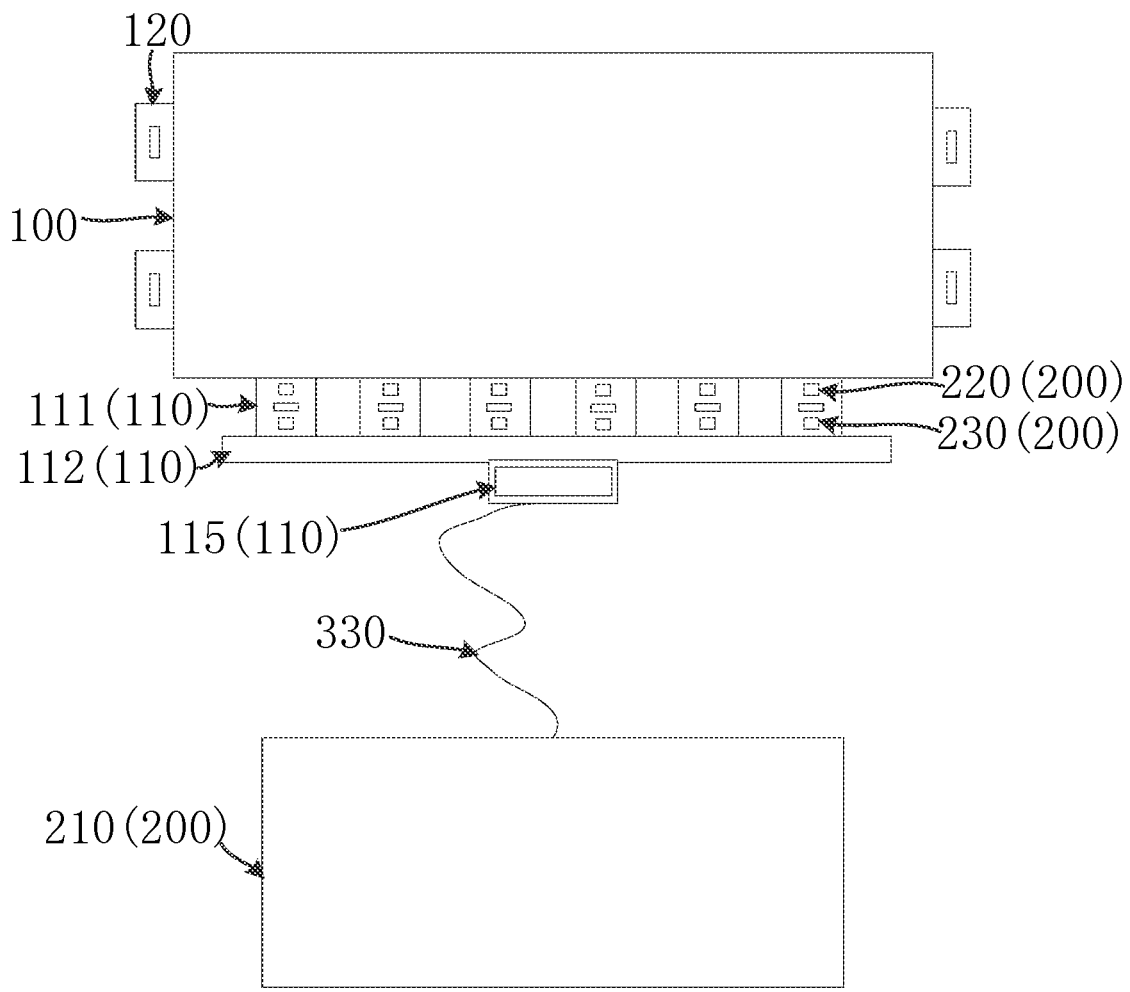
FIG. 6 is a schematic structural diagram illustrating a display panel detection device and a display panel that are cooperated according to an embodiment of the present application.

In an embodiment of the present application, as shown in FIG. 6, which is a schematic structural diagram illustrating a display panel detection device and a display panel that are cooperated according to an embodiment of the present application, the detection system 200 includes a picture storage device 220, a power board 210 and clock signal device 230. The picture storage device is configured to store a picture for detection, and the picture storage device 220 is stored in a source driver circuit board 110 of the display panel 100; the power board 210 is configured to generate a power signal, and the power board 210 is electrically connected with the source driver circuit board 110 directly; the clock signal device 230 is configured to generate a clock signal, and the clock signal device 230 and the source driver circuit board 110 are electrically connected.

The source driver circuit board 110 includes a source driver chip 111, a connection bar and a third connector 115.

Specifically, the picture storage device 220 is stored in the source driver chip 111, and a logic board is not required for providing a picture, so as to be used for the high temperature and high humidity detection.

The picture includes but is not limited to red picture, green picture, blue picture, black picture and gray picture.

The power signal is a DC voltage signal or an AC voltage signal. The power signal includes but is not limited to a ground signal, a relatively high voltage signal and a relatively low voltage signal.

The clock signal device 230 is disposed on the source driver circuit board. For example, the clock signal device 230 is disposed on the source driver chip 111, or the clock signal device 230 is disposed on the connection bar 112, or the clock signal device 230 is disposed on the third connector 115.

The clock signal device 230 is disposed on the source driver chip 111 of the source driver circuit board. The power board is connected with the third connector 115 of the source driver circuit board through a third connection line 330, and the power signal is transmitted to the third connector through the third connection line; the source driver chip is connected with the third connector through the connection bar. This is another specific way to provide the clock signal device. The device that generates the clock signal is integrated on the source driver circuit board of the source driver chip, so that the source driver chip can generate clock signal directly and complete the transmission. Thus, during the detection process, only the power signal of the power board needs to be transmitted to the source driver circuit board without additional connection to the logic board or other circuit portions. In this way, the assembly process is further saved and the detection efficiency is further improved. In addition, the power board transmits the power signal by being connected with the third connector directly through the third connection line, and the connection way is simple and convenient, without additional connection to other circuit portions, facilitating the operation of the operator.

In this embodiment, an oscillator may be integrated on the source driver chip, and the clock signal is generated by the oscillator. Of course, it should be noted that in this embodiment, other structures may also be integrated on the power board to generate a clock signal.

The present embodiment not only saves the logic board or a plurality of other detection circuit boards, and avoids the logic board and other detection boards being damaged and saves the cost, but also saves the procedure and improves the detection efficiency.

Figure 7:
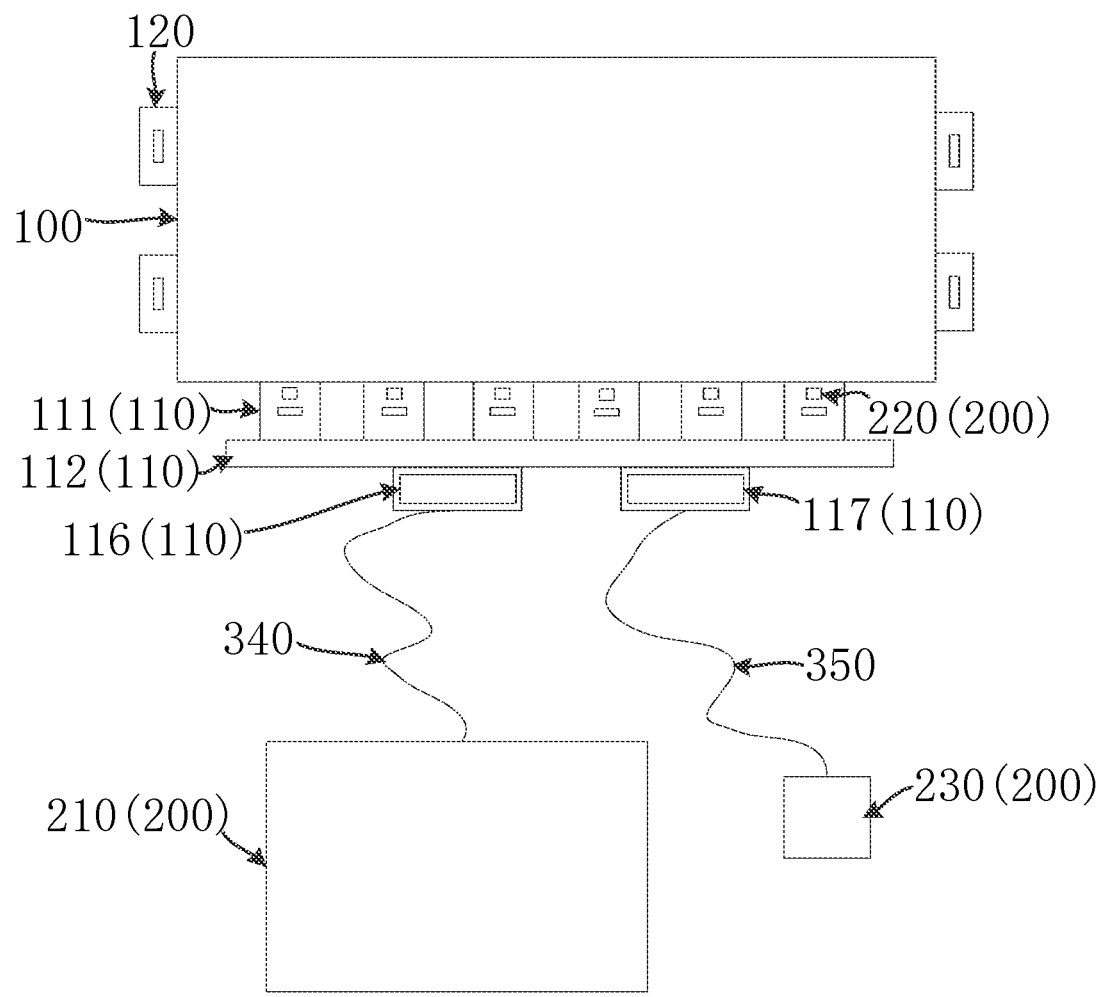
FIG. 7 is a schematic structural diagram illustrating a display panel detection device and a display panel that are cooperated according to an embodiment of the present application.

In an embodiment of the present application, as shown in FIG. 7, which is a schematic structural diagram illustrating a display panel detection device and a display panel that are cooperated according to an embodiment of the present application, the detection system 200 includes a picture storage device 220, a power board 210 and clock signal device 230. The picture storage device is configured to store a picture for detection, and the picture storage device 220 is stored in a source driver circuit board 110 of the display panel 100; the power board 210 is configured to generate a power signal, and the power board 210 is electrically connected with the source driver circuit board 110 directly; the clock signal device 230 is configured to generate a clock signal, and the clock signal device 230 and the source driver circuit board 110 are electrically connected.

The source driver circuit board 110 includes a source driver chip 111, a connection bar, a fourth connector 116 and a fifth connector 117.

Specifically, the picture storage device 220 is stored in the source driver chip 111, and a logic board is not required for providing a picture, so as to be used for the high temperature and high humidity detection.

The picture includes but is not limited to red picture, green picture, blue picture, black picture and gray picture.

The power signal is a DC voltage signal or an AC voltage signal. The power signal includes but is not limited to a ground signal, a relatively high voltage signal and a relatively low voltage signal.

The clock signal device 230 is provided separately, and the clock signal device may be a clock signal board, or a circuit board integrated directly with an oscillator, and a clock signal is generated by the oscillator. Of course, it should be noted that in the present embodiment, other structures may also be integrated on the circuit board to generate a clock signal. In the present application, the clock signal device 230 is directly connected with the fifth connector 117 through the fifth connection line 350, the fifth connector 117 is connected with the connection bar 112, and the connection bar 112 is connected with the source driver chip 111, so that the clock signal generated by the clock signal device is transmitted to the source driver chip through the fifth connection line, the fifth connector and the connection bar. The power board 210 is connected with the fourth connector 116 through the fourth connection line 340, the fourth connector is connected with the connection bar, and the connection bar is connected with the source driver chip, so that the power signal is transmitted to the source driver chip through the fourth connection line, the fourth connector and the connection bar, so as to perform the high temperature and high humidity detection.

However, it should be noted that the clock signal device may not be electrically connected with the source driver circuit board directly in this embodiment.

Figure 8:
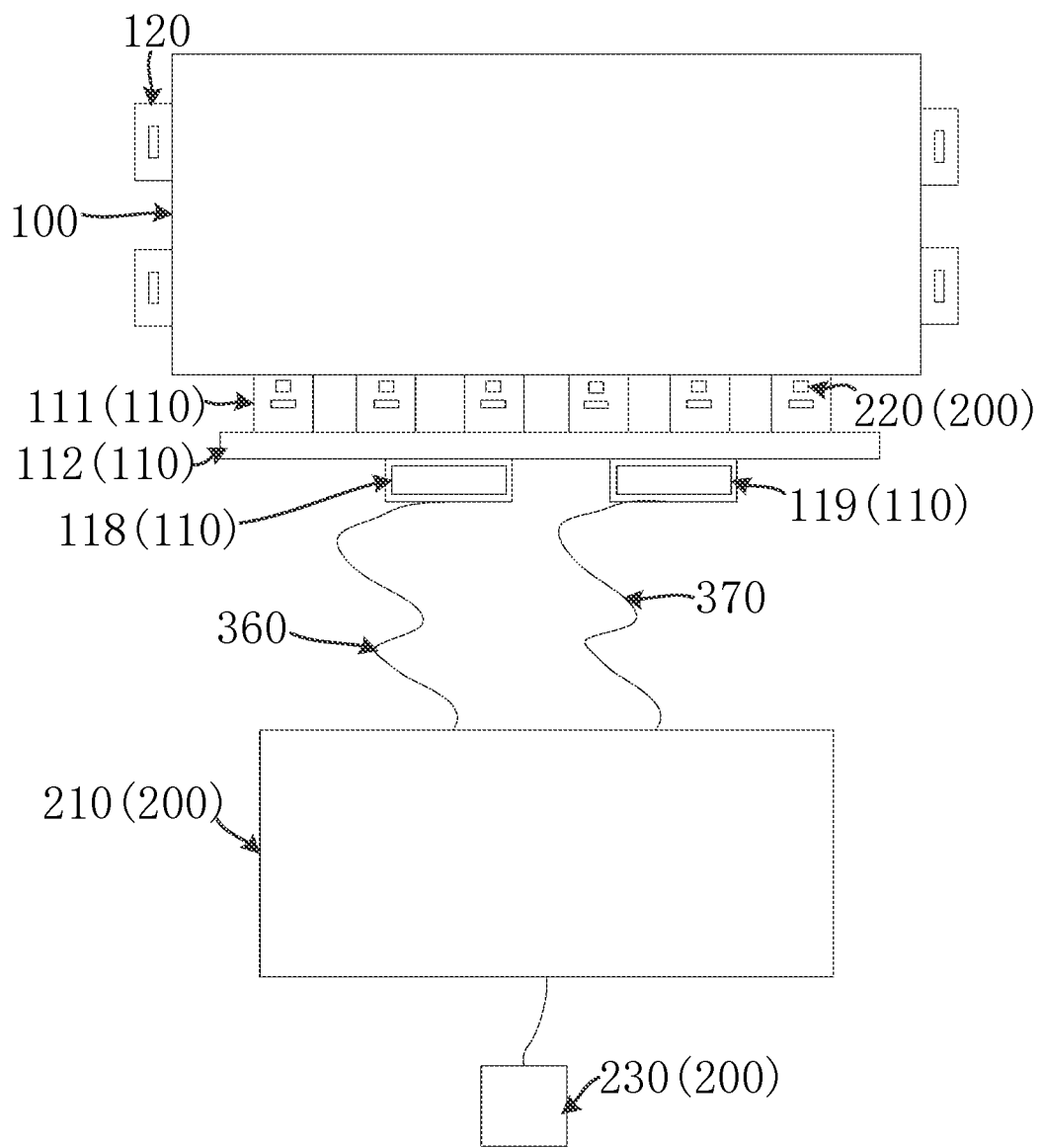
FIG. 8 is a schematic structural diagram illustrating a display panel detection device and a display panel that are cooperated according to an embodiment of the present application.

In some embodiments, as shown in FIG. 8, the clock signal device 230 is electrically connected with the power board 210, and the power board is then connected with a sixth connector 118 through a sixth connection line 360 to transmit a power signal; the power board is then connected with a seventh connector 119 through a seventh connection line 370 to transmit a clock signal. The connection bar 112 is electrically connected with the sixth connector and the seventh connector respectively, so that the power signal and the clock signal is transmitted to the source driver chip 111, so as to achieve the high temperature and high humidity detection.

In some embodiments, the power board is electrically connected with the clock signal device directly; the clock signal device is electrically connected with a connector, and the connector is electrically connected with the connection bar; and the connection bar is electrically connected with the source driver chip. In this way, the power signal of the power board is transmitted to the source driver circuit board through the clock signal device. The clock signal can be transmitted to the connector directly and to the source driver chip through the connection bar.

The present embodiment not only saves the logic board or a plurality of other detection circuit boards, avoids the logic board and other detection boards being damaged and saves the cost, but also saves the procedure and improves the detection efficiency.

In the present application, the display panel 100 of the present application further includes a gate driver chip 120.

In the present application, a computer system is further included, which is connected with the display panel 100. The computer system is provided with a sample picture and a picture comparison detection program for comparing the consistency of the picture and the sample picture so as to generate a comparison result. For example, the display panel 100 has a data transmission port. The computer system has a serial interface (USB interface). The serial interface of the computer is connected with the data transmission port respectively through a data line. The computer system obtains the digital picture signal output by the display panel 100 through the serial interface, restores the digital picture signal to the picture, and performs pixel comparison analysis with the sample picture. If the comparison result is within an error range set by the computer system, then the picture test passes and the test result is displayed on the display of the computer system, and the test ends.

The above is a further detailed description of the present application in combination with the embodiments, and the specific implementation of the present application is not limited to the description. It will be apparent to those skilled in the art that a number of simple deductions or substitutions may be made without departing from the concept of the present application, and shall be deemed as the scope of the present application.

The invention claimed is:

1. A display panel detection method, comprising the following steps:
storing a picture for detection into a source driver circuit board of the display panel;
electrically connecting a power board generating a power signal directly with the source driver circuit board;
transmitting the power signal and a clock signal to the source driver circuit board, the clock signal being generated by the power board directly;
connecting a data transmission port of the display panel with a serial interface of a computer system, the computer system being provided with a sample picture and a picture comparison detection program;
comparing pixel consistency of the picture and the sample picture so as to produce a comparison result;
wherein the power board is connected with a first connector of the source driver circuit board through a first connection line, and the power board is connected with a second connector of the source driver circuit board through a second connection line; the power signal is transmitted to the first connector through the first connection line, and the clock signal is transmitted to the second connector through the second connection line; a source driver chip of the source driver circuit board is connected with the first connector and the second connector respectively through a connection bar, and
the data transmission port transmits a digital picture signal of the picture to the serial interface, and the computer system restores the digital picture signal to the picture.

2. The method according to claim 1, wherein the picture is stored in the source driver chip of the source driver circuit board.

3. The method according to claim 1, wherein the display panel further includes a gate driver chip.

4. The method according to claim 1, wherein an oscillator is integrated on the power board, and the clock signal is generated by the oscillator.

5. The method according to claim 1, wherein the power signal is a DC voltage signal.

6. The method according to claim 1, wherein the power signal is an AC voltage signal.

7. The method according to claim 1, wherein the power signal includes a ground signal, wherein the power signal includes a relatively high voltage signal, and wherein the power signal includes a relatively low voltage signal.

8. A display panel detection method, comprising:
storing a picture for detection into a source driver circuit board of the display panel;
electrically connecting a power board generating a power signal directly with the source driver circuit board;
transmitting the power signal and a clock signal to the source driver circuit board, the clock signal being directly generated by the power board;
connecting a data transmission port of the display panel with a serial interface of a computer system, the computer system being provided with a sample picture and a picture comparison detection program;
comparing pixel consistency of the picture and the sample picture so as to produce a comparison result;
wherein the power board is connected with a first connector of the source driver circuit board through a first connection line, and the power board is connected with a second connector of the source driver circuit board through a second connection line; the power signal is transmitted to the first connector through the first connection line, and the clock signal is transmitted to the second connector through the second connection line; a source driver chip of the source driver circuit board is connected with the first connector and the second connector respectively through a connection bar;
the picture is stored in the source driver chip of the source driver circuit board,
the display panel further includes a gate driver chip;
an oscillator is integrated on the power board, and the clock signal being generated by the oscillator; and
the data transmission port transmits a digital picture signal of the picture to the serial interface, and the computer system restores the digital picture signal to the picture.

9. The method according to claim 8, wherein the power signal is a DC voltage signal.

10. The method according to claim 8, wherein the power signal is an AC voltage signal.

11. A display panel detection system, comprising:
a picture storage device configured to store a picture for detection, the picture storage device being stored in a source driver circuit board of the display panel;
a power board configured to generate a power signal, the power board being electrically connected with the source driver circuit board directly;
a clock signal device disposed on the power board, configured to generate a clock signal, the clock signal device and the source driver circuit board being electrically connected; and
a computer system having a serial interface connected with a data transmission port of the display panel, the computer system being provided with a sample picture and a picture comparison detection program for comparing pixel consistency of the picture and the sample picture so as to produce a comparison result;
wherein the power board is connected with a first connector of the source driver circuit board through a first connection line, and the power board is connected with a second connector of the source driver circuit board through a second connection line; the power signal is transmitted to the first connector through the first connection line, and the clock signal is transmitted to the second connector through the second connection line; a source driver chip of the source driver circuit board is connected with the first connector and the second connector respectively through a connection bar, and
the data transmission port transmits a digital picture signal of the picture to the serial interface, and the computer system restores the digital picture signal to the picture.

12. The system according to claim 11, wherein the display panel further includes a gate driver chip.

13. The system according to claim 11, wherein the clock signal device is a clock signal board.

14. The system according to claim 11, wherein the clock signal device includes a circuit board integrated with an oscillator, and the clock signal is generated by the oscillator.

15. The system according to claim 11, wherein the power signal is a DC voltage signal.

16. The system according to claim 11, wherein the power signal is an AC voltage signal.

17. The system according to claim 11, wherein the power signal includes a ground signal, wherein the power signal includes a relatively high voltage signal, and wherein the power signal includes a relatively low voltage signal.

* * * * *